(12) United States Patent
Hirose et al.

(10) Patent No.: US 9,478,377 B2
(45) Date of Patent: Oct. 25, 2016

(54) CURRENT INTERRUPTION DEVICE AND ELECTRICITY STORAGE DEVICE USING THE SAME

(71) Applicants: KABUSHIKI KAISHA TOYOTA JIDOSHOKKI, Kariya-shi, Aichi (JP); Eagle Industry Co., Ltd., Tokyo (JP)

(72) Inventors: Takayuki Hirose, Kariya (JP); Motoaki Okuda, Kariya (JP); Hiroyasu Nishihara, Kariya (JP); Toshiaki Iwa, Tokyo (JP); Yoshihiro Ogawa, Tokyo (JP); Makoto Mitsuyasu, Tokyo (JP); Norimitsu Akiyoshi, Tokyo (JP)

(73) Assignees: KABUSHIKI KAISHA TOYOTA JIDOSHOKKI, Aichi (JP); Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 15/029,459

(22) PCT Filed: Sep. 16, 2014

(86) PCT No.: PCT/JP2014/074434
§ 371 (c)(1),
(2) Date: Apr. 14, 2016

(87) PCT Pub. No.: WO2015/056511
PCT Pub. Date: Apr. 23, 2015

(65) Prior Publication Data
US 2016/0268077 A1  Sep. 15, 2016

(30) Foreign Application Priority Data
Oct. 16, 2013 (JP) .................................. 2013-215804

(51) Int. Cl.
*H01M 2/30* (2006.01)
*H01M 2/26* (2006.01)
(Continued)

(52) U.S. Cl.
CPC ............ *H01H 35/2685* (2013.01); *H01G 2/14* (2013.01); *H01H 1/58* (2013.01); *H01M 2/26* (2013.01);
(Continued)

(58) Field of Classification Search
CPC ........ H01M 2/30; H01M 2/345; H01M 2/26; H01H 35/2685; H01H 1/58; H01H 2207/026; H01H 2001/5877; H01G 2/14
See application file for complete search history.

(56) References Cited

U.S. PATENT DOCUMENTS 5,567,539 A * 10/1996 Takahashi ............ H01H 37/323
429/57
5,707,756 A * 1/1998 Inoue ................... H01M 2/1235
429/57
(Continued)

FOREIGN PATENT DOCUMENTS

JP  8-153536 A  6/1996
JP  9-102330 A  4/1997
(Continued)

OTHER PUBLICATIONS

International Preliminary Report on Patentability and Written Opinion for PCT/JP2014/074434 dated Apr. 28, 2016.
(Continued)

*Primary Examiner* — Patrick Ryan
*Assistant Examiner* — Kiran Akhtar
(74) *Attorney, Agent, or Firm* — Sughrue Mion, PLLC

(57) ABSTRACT

A current interruption device is provided with a first conducting member that is fixed to a casing, a second conducting member that is disposed at a position opposed to the first conducting member, a first deforming member, and a second deforming member. The first deforming member makes contact with the second conducting member when pressure in the casing is equal to or less than a predetermined value, and is configured not to make contact with the second conducting member when the pressure in the casing exceeds the predetermined value. The second deforming member is provided with a projection in a shape projecting toward a center portion of the second conducting member. A restricting structure that restricts a movement of the first deforming member is provided on the first conducting member. A restricting structure that restricts a movement of the second deforming member is provided on the second conducting member.

4 Claims, 3 Drawing Sheets

(51) Int. Cl.
*H01H 35/26* (2006.01)
*H01G 2/14* (2006.01)
*H01H 1/58* (2006.01)
*H01M 2/34* (2006.01)
*H01H 71/02* (2006.01)

(52) U.S. Cl.
CPC ............... *H01M 2/30* (2013.01); *H01M 2/345* (2013.01); *H01H 2001/5877* (2013.01); *H01H 2071/0292* (2013.01); *H01H 2207/026* (2013.01); *H01M 2200/20* (2013.01); *H01M 2220/20* (2013.01)

(56) References Cited

U.S. PATENT DOCUMENTS

| | | | |
|---|---|---|---|
| 6,524,739 | B1 | 2/2003 | Iwaizono et al. |
| 2008/0038627 | A1* | 2/2008 | Yamauchi ............... H01M 2/34 429/53 |
| 2013/0196186 | A1 | 8/2013 | Yokoyama et al. |
| 2013/0196187 | A1 | 8/2013 | Yokoyama et al. |
| 2013/0196189 | A1 | 8/2013 | Minami et al. |
| 2013/0196220 | A1* | 8/2013 | Okutani ................. H01M 2/34 429/179 |
| 2013/0224536 | A1 | 8/2013 | Hattori et al. |
| 2015/0079432 | A1 | 3/2015 | Okuda et al. |

FOREIGN PATENT DOCUMENTS

| | | |
|---|---|---|
| JP | 10-223204 A | 8/1998 |
| JP | 2000-149918 A | 5/2000 |
| JP | 2002-216743 A | 8/2002 |
| JP | 2003-31207 A | 1/2003 |
| JP | 2008-27668 A | 2/2008 |
| JP | 2009-266714 A | 11/2009 |
| JP | 2012-38529 A | 2/2012 |
| JP | 2013-101889 A | 5/2013 |
| JP | 2013-157104 A | 8/2013 |
| JP | 2013-157137 A | 8/2013 |
| JP | 2013-157154 A | 8/2013 |
| JP | 2013-175428 A | 9/2013 |
| JP | 2013-182724 A | 9/2013 |
| WO | 2013/154166 A1 | 10/2013 |

OTHER PUBLICATIONS

International Search Report for PCT/JP2014/074434 dated Nov. 11, 2014.

* cited by examiner

CURRENT INTERRUPTION DEVICE AND ELECTRICITY STORAGE DEVICE USING THE SAME

CROSS REFERENCE TO RELATED APPLICATIONS

This application is a National Stage of International Application No. PCT/JP2014/074434 filed Sep. 16, 2014, claiming priority based on Japanese Patent Application No. 2013-215804 filed Oct. 16, 2013, the contents of all of which are incorporated herein by reference in their entirety.

TECHNICAL FIELD

The present teachings disclose an art related to a current interruption device and an electricity storage device using the same.

BACKGROUND ART

A development is being made for current interruption device that cuts off current flowing between electrode terminals (a positive electrode terminal and a negative electrode terminal) when an electricity storage device is overcharged or when a short circuiting occurs therein. The current interruption device is arranged between an electrode terminal and an electrode (between a positive electrode terminal and a positive electrode, or between a negative electrode terminal and a negative electrode). Japanese Patent Application Publication No. 2012-38529 discloses a current interruption device that fixes a first conducting member (caulking part) to a casing and arranges a second conducting member (power collecting terminal) at a position opposed to the first conducting member. Hereinbelow, Japanese Patent Application Publication No. 2012-38529 will be termed Patent Reference 1. An end portion of a deforming member is fixed to the first conducting member. A center portion of the deforming member is in contact with the second conducting member. An end portion of the deforming member is in contact with the second conducting member via an insulator (internal lower gasket). When the center portion of the deforming member is in contact with the second conducting member, the first conducting member and the second conducting member are configured to be conducted, and the first conducting member and the second conducting member are nonconducted when the center pardon of the deforming member separates away from the second conducting member. In the current interruption device of Patent Reference 1, the center portion of the deforming member separates away from the second conducting member when pressure inside the electricity storage device exceeds a predetermined value, and the conduction between the electrode terminal and the electrode is interrupted by bringing the first conducting member and the second conducting member to be nonconducted.

BRIEF SUMMARY

In order for the current interruption device to ensure its operation, the deforming member needs to be able to separate smoothly away from the second conducting member when the pressure in the electricity storage device exceeds the predetermined value. If a position of the deforming member relative to the first conducting member is displaced from its designed value, a position of the deforming member relative to the second conducting member may also be displaced from its designed value. As a result, the operation of the current interruption device may become unstable. In this description, a technique for facilitating a highly reliable current interruption device is provided.

A current interruption device disclosed herein is configured to interrupt an electrical conduction between an electrode terminal and an electrode in a case where pressure in a casing of an electricity storage device exceeds a predetermined value. The current interruption device comprises: a first conducting member, a second conducting member, a first deforming member, and a second deforming member. The first conducting member is fixed to the casing. The second conducting member is disposed at a position opposed to the first conducting member. The first deforming member is disposed between the first conducting member and the second conducting member. The first deforming member is configured to make contact with the second conducting member when the pressure in the casing is equal to or less than the predetermined value, and configured not to make contact with the second conducting member when the pressure in the casing exceeds the predetermined value. The second deforming member is disposed at an opposite side of the first deforming member relative to the second conducting member. The second deforming member comprises a projection which projects toward a center portion of the second conducting member. The center portion projects in a direction away from the second conducting member when the pressure in the casing is equal to or less than the predetermined value, and the center portion moves toward the second conducting member so that the projection makes contact with the second conducting member when the pressure in the casing exceeds the predetermined value.

The present description discloses a current interruption device in which a restricting structure that restricts a movement of the first deforming member is disposed on the first conducting member on a second conducting member side. Furthermore, the present description further discloses a current interruption device in which a restricting structure that restricts a movement of the second deforming member is disposed on the second conducting member on an opposite side from a first deforming member side.

The current interruption device has the movement of the deforming member (the first deforming member, the second deforming member) restricted, so the displacement of the position of the deforming member relative to the conducting member (the first conducting member, the second conducting member) from the designed value can be suppressed. The operation of the current interruption device, that is, the operation of the deforming member can be stabilized against changes in the pressure in the casing.

According to the technique disclosed herein, a highly reliable current interruption device can be facilitated.

DETAILED DESCRIPTION

Figure 1:
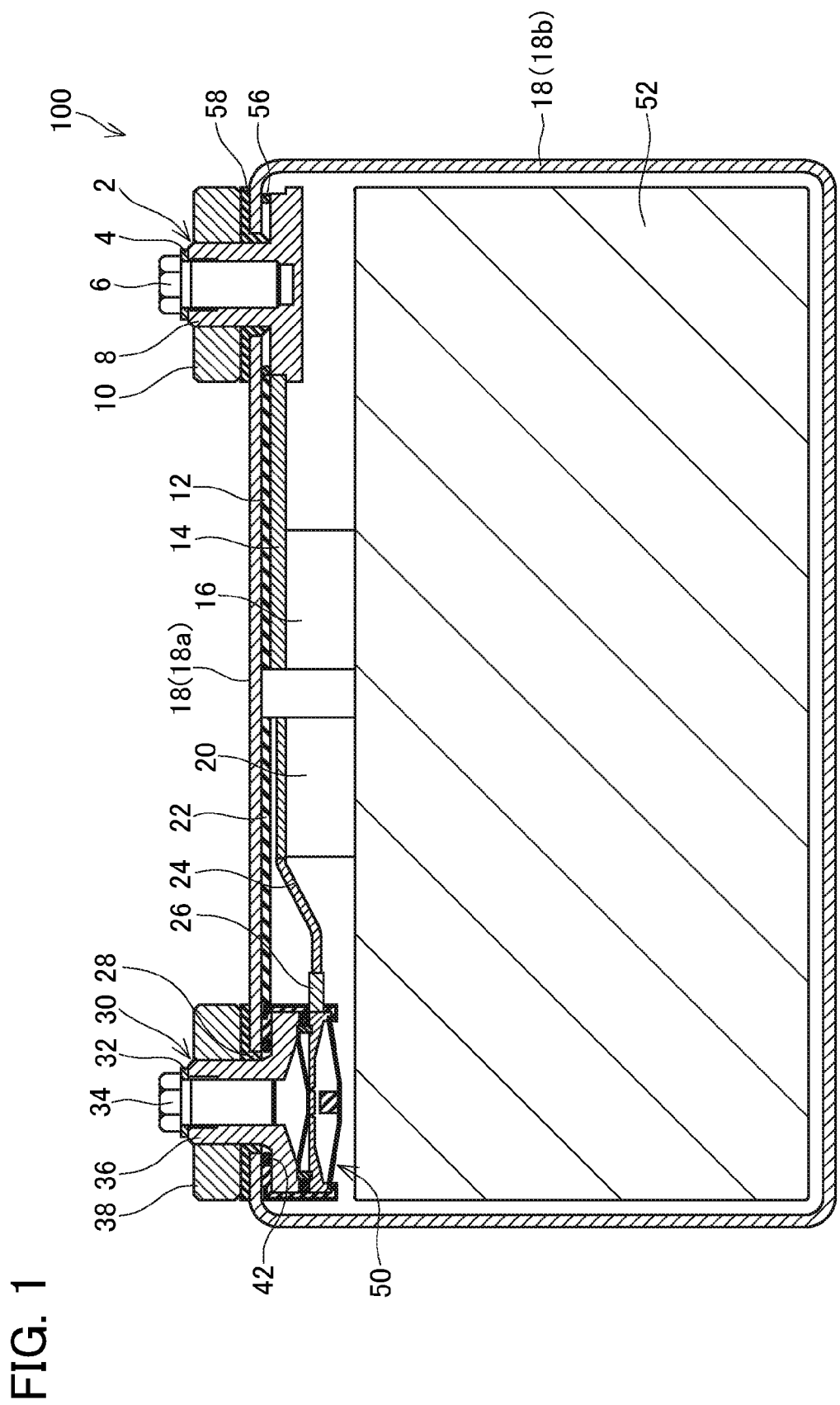
FIG. 1 is a cross sectional view of an electricity storage device of a first embodiment.

Hereinbelow, some of technical features of an electricity storage device disclosed herein will be listed. Notably, each of the matters described hereinbelow has technical usefulness independently.

An electricity storage device comprises a casing, an electrode assembly, an electrode terminal, and a current interruption device. The electrode assembly may be housed in a casing, and may comprise a positive electrode and a negative electrode. The electrode terminal may communicate inside and outside of the casing. That is, a part of the electrode terminal may be positioned outside the casing, and another part of the electrode may be positioned inside the casing. The current interruption device may be connected to a negative electrode terminal and the negative electrode. In this case, the current interruption device is arranged on a current passage of the negative electrode terminal and the negative electrode, and switches the negative electrode terminal and the negative electrode from a conducted state to a nonconducted state when internal pressure of the casing exceeds a predetermined value. The current interruption device may be connected to a positive electrode terminal and the positive electrode. In this case, the current interruption device is arranged on a current passage of the positive electrode terminal and the positive electrode, and switches the positive electrode terminal and the positive electrode from a conducted state to a nonconducted state when the internal pressure of the casing exceeds a predetermined value.

The current interruption device may comprise a first conducting member, a second conducting member, a first deforming member, and a second deforming member. The first conducting member may be fixed to the casing of the electricity storage device. The first conducting member may be a part of the positive electrode terminal, or may be a part of the negative electrode terminal.

The second conducting member may be disposed at a position opposed to the first conducting member with an interval from the first conducting member. That is, the first conducting member and the second conducting member may not be in direct contact. A thickness of a center portion of the second conducting member may be thinner than a thickness of its end portion. Further, a breakable move that serves as a starting point of breakage when the pressure in the casing exceeds the predetermined value may be provided at the center portion of the second conducting member. The breakable groove may be provided in a continuous or intermittent circular shape at the center portion of the second conducting member. In a case where the first conducting member is a part of the electrode terminal (positive electrode terminal or negative electrode terminal), the second conducting member may be opposed to the electrode terminal. In a case where the fast conducting member is not a part of the electrode terminal, the second conducting member may not be opposed to the electrode terminal.

An insulating member may be disposed between the first conducting member and the second conducting member. Further, by the insulating member, the interval between the first conducting member and the second conducting member may thereby be maintained. That is, the interval may be provided between the first conducting member and the second conducting member in a range other than where the insulating member is provided.

An insulating sealing member may be disposed between the first conducting member and the second conducting member. The sealing member isolates a space surrounded by the sealing member, the first conducting member, and the second conducting member from a space outside the current interruption device. The sealing member may seal the first conducting member, and the second conducting member on an outer side of the aforementioned insulating member. The sealing member may be disposed between the first conducting member, and the second conducting member in a state of being noncontact with the insulating member.

A groove may be provided on a second conducting member side of the first conducting member and/or a first conducting member side of the second conducting member, and the aforementioned insulating member may be positioned within this groove. A displacement of the insulating member can be prevented. The insulating member can be prevented from contacting the first deforming member, and the insulating member can also be prevented from contacting the sealing member.

The first deforming member may be disposed between the first conducting member and the second conducting member. The first deforming member may be fixed to the first conducting member on an inner side of the insulating member. The first deforming member may be fixed to the first conducting member in a state of not being in contact with the insulating member. The first deforming member may be in contact with the second conducting member when the pressure in the casing is equal to or less than the predetermined value. The end portion of the first deforming member may be separated from the second conducting member, and the center portion of the first deforming member may be in contact with the center portion of the second conducting member. Further, the center portion of the first deforming member may be fixed to the second conducting member at a position surrounded by the breakable groove. The first deforming member may come to not make contact with the second conducting member when the pressure in the casing exceeds the predetermined value. The first deforming member may invert so as to separate away from the second conducting member when the pressure in the casing exceeds the predetermined value. The first deforming member may separate away from the second conducting member by the center portion of the second conducting member being broken when the pressure in the casing exceeds the predetermined value.

A restricting structure that restricts a movement of the first deforming member may be provided on the first conducting member on a second conducting member side. Further, the restricting structure may be a recess provided on the first conducting member on the second conducting member side. In this case, an outer circumferential edge of the first deforming member may be in contact with a side surface of the recess. The positional displacement of the first deforming member relative to the first conducting member can be prevented.

The second deforming member may be arranged on an opposite side from the first deforming member relative to the second conducting member. That is, the second conducting member may be disposed between the first deforming member and the second deforming member. The second deforming member may be disposed between the second conducting member and the electrode assembly. The second deforming member may be fixed to the second conducting member. A projection having a shape projecting toward the second conducting member may be provided at the center portion of the second deforming member on the second conducting member side. The projection may be opposed to a portion surrounded by the breakable groove of the second conducting member in a state of being separated from the conducting member. The projection may have an insulating property.

The second deforming member may project to a direction along which its center portion separates away from the second conducting member when the pressure in the casing is equal to or less than the predetermined value, and when the pressure in the casing exceeds the predetermined value, the center portion may move toward the second conducting member and the projection may make contact with the second conducting member. That is, the second deforming member may be present at a first position where the center portion projects toward the direction separating away from the second conducting member when the pressure in the casing is equal to or less than the predetermined value, and may be present at a second position where the center portion projects toward the second conducting member when the pressure in the casing exceeds the predetermined value.

A restricting structure that restricts a movement of the second deforming member may be provided on the second conducting member on an opposite side from a first conducting member side. Further, the restricting structure may be a recess provided on the second conducting member on the opposite side from the first conducting member side. In this case, an outer circumferential edge of the second deforming member may be in contact with a side surface of the recess. The positional displacement of the second deforming member relative to the second conducting member can be prevented.

Both the first deforming member and the second conducting member may be provided on a current passage of the electrode terminal and the electrode. The first deforming member may be connected to one of the electrode terminal and the electrode, the second conducting member may be connected to the other of the electrode terminal and the electrode, the other of the electrode terminal and the electrode may be insulated from the first deforming member when the conduction between the first deforming member and the second conducting member is interrupted, and the one of the electrode terminal and the electrode may be insulated from the second conducting member.

As an example of the electricity storage device disclosed in this description, a secondary battery, a capacitor, and the like may be exemplified. As an example of the secondary battery, a laminate type electrode assembly in which cells having electrode pairs (negative electrode and positive electrode) facing each other via separators are laminated in plurality, a roll-type electrode assembly in which sheet-like cells having electrode pairs facing each other via separators are processed into a swirling shape, and the like may be exemplified. Further, the electricity storage device disclosed in this description may for example be mounted in a vehicle, and may supply power to a motor. Hereinbelow, a structure of the electricity storage device will be described.

Notably, in the below description, an electricity storage device in which both of the positive electrode terminal and the negative electrode terminal are exposed along one direction of the casing will be described. However, the technique disclosed, in this description can be adapted to an electricity storage device of a type in which the casing functions as the electrode terminal of one of the polarities (for example, positive electrode), and the electrode terminal of the other polarity (for example, negative electrode) is fixed to the casing in a state of being insulated from the casing, such as a cylinder-type battery, and the like. Further, in the below description, an electricity storage device in which the current interruption device is connected to the negative electrode terminal and the negative electrode will be described. The technique disclosed in this description can be adapted to an electricity storage device in which the current interruption device is connected to the positive electrode terminal and the positive electrode.

EMBODIMENTS

First Embodiment

A structure of an electricity storage device 100 will be described with reference to FIG. 1. The electricity storage device 100 comprises a casing 18, an electrode assembly 52, a positive electrode terminal 2, a negative electrode terminal 30, and a current interruption device 50. The casing 18 is made of metal, and has a substantially rectangular solid shape. The casing 18 comprises a cover portion 18a and a main body portion 18b. The electrode assembly 52 and the current interruption device 50 are housed inside the casing 18. The electrode assembly 52 comprises a positive electrode and a negative electrode (not shown). A positive electrode tab 16 is fixed to the positive electrode, and a negative electrode tab 20 is fixed to the negative electrode. Electrolytic solution is filled in the casing 18, and air is removed therefrom.

The positive electrode terminal 2 and the negative electrode terminal 30 communicate outside and inside of the casing 18. The positive electrode terminal 2 and the negative electrode terminal 30 are disposed along one direction of the casing 18 (upward on a sheet surface of FIG. 1). That is, both of the positive electrode terminal 2 and the negative electrode terminal 30 are disposed in the same direction relative to the electrode assembly 52 (direction along which the cover portion 18a is provided). The positive electrode terminal 2 comprises a bolt portion 8. The positive electrode terminal 2 is fixed to the casing 18 by engaging a nut 10 to the bolt portion 8. One end of the positive electrode terminal 2 is positioned outside the casing 18, and the other end thereof is positioned inside the casing 18. Similarly, the negative electrode terminal 30 comprises a bolt portion 36. The negative electrode terminal 30 is fixed to the casing 18 by engaging a nut 38 to the bolt portion 36. One end of the negative electrode terminal 30 is positioned outside the casing 18, and the other end thereof is positioned inside the casing 18.

A positive electrode lead 14 is connected to the positive electrode terminal 2. The positive electrode lead 14 is connected to the positive electrode tab 16. The positive electrode terminal 2 is electrically connected to the positive electrode tab 16 via the positive electrode lead 14. That is, the positive electrode terminal 2 is electrically connected to the positive electrode of the electrode assembly 52. The positive electrode lead 14 is insulated from the casing 18 by an insulating member. As the insulating member, for example, an insulating sheet 12 is used. The positive electrode terminal 2 and the nut 10 are insulated from the casing 18 by an insulating member 58. An insulating sealing member 56 is disposed between the positive electrode terminal 2 and the casing 18. A space between the positive electrode terminal 2 and the casing 18 is sealed by the sealing member 56. Notably, a bus bar 4 is fixed to the positive electrode terminal 2 by a bus bar bolt 6.

The negative electrode terminal 30 is connected to the current interruption device 50. Details of the current interruption device 50 will be described later. The current interruption device 50 is connected to a negative electrode lead 24 via a metal connecting member 26. Notably, the connecting member 26 and the negative electrode lead 24 may be one member that is integrally formed. The negative electrode terminal 30 is electrically connected to the negative electrode tab 20 via the negative electrode lead 24. That is, the negative electrode terminal 30 is electrically connected to the negative electrode of the electrode assembly 52. The negative electrode lead 24 is insulated from the casing 18 by an insulating member. As the insulating member, for example, an insulating sheet 22 is used. The negative electrode terminal 30 and the nut 38 are insulated from the casing 18 by an insulating member 28. An insulating sealing member 42 is disposed between the negative electrode terminal 30 and the casing 18. A space between the negative electrode terminal 30 and the casing 18 is sealed by the sealing member 42. Notably, a bus bar 32 is fixed to the negative electrode terminal 30 by a bus bar bolt 34.

In the electricity storage device 100, when pressure in the casing 18 is equal to or less than a predetermined value, the negative electrode terminal 30 and the negative electrode tab 20 are electrically connected via the current interruption device 50. That is, a conduction is established between the negative electrode terminal 30 and the negative electrode. When the pressure in the casing 18 exceeds the predetermined value, the current interruption device 50 interrupts the conduction between the negative electrode terminal 30 and the negative electrode tab 20, and prevents a current from flowing in the electricity storage device 100.

Figure 2:
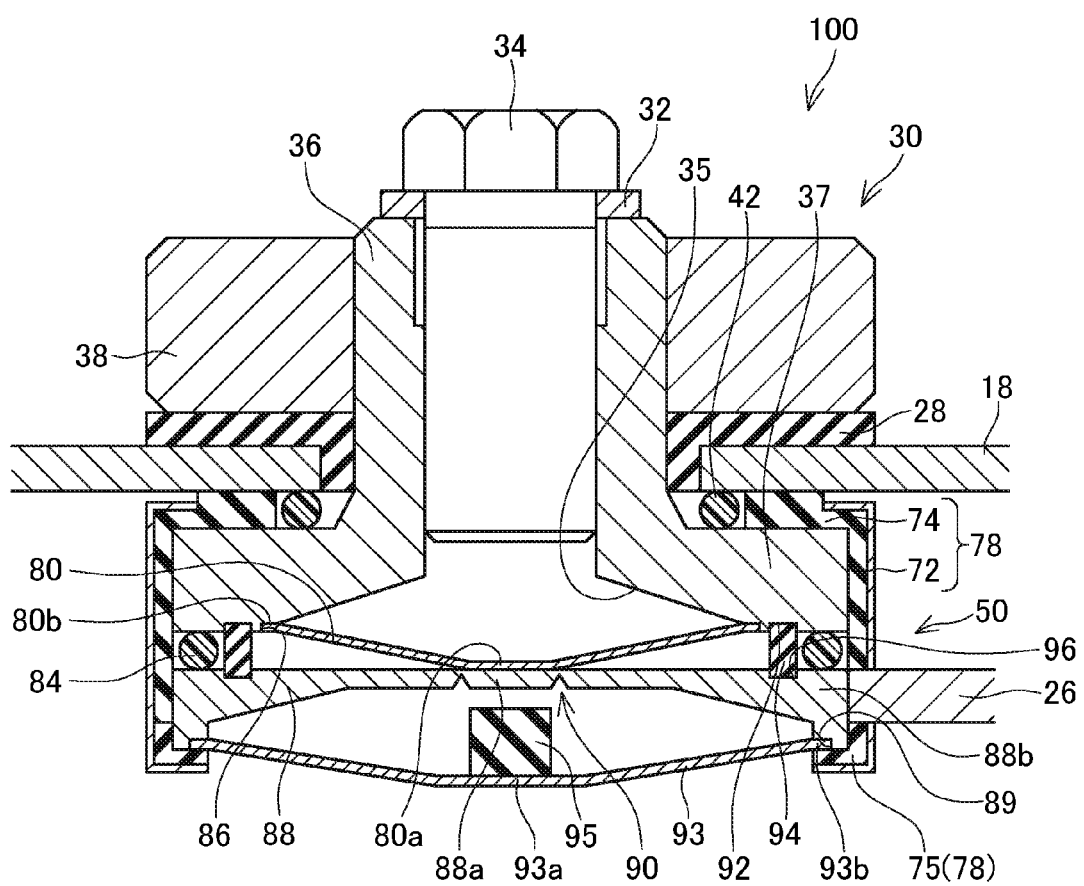
FIG. 2 is an enlarged cross sectional view of a current interruption device used in the electricity storage device of the first embodiment.

With reference to FIG. 2, the current interruption device 50 will be described. The current interruption device 50 comprises an enlarged diameter portion 37 of the negative electrode terminal 30, a metal-made breakable plate 88, a metal-made first deforming member 80, and a metal-made second deforming member 93. As aforementioned, the enlarged diameter portion 37 (negative electrode terminal 30) is fixed to the casing 18. The negative electrode terminal 30 is an example of the first conducting member. The breakable plate 88 is arranged at a position opposed to the enlarged diameter portion 37 with a space from the enlarged diameter portion 37. The breakable plate 88 is an example of the second conducting member. The second deforming member 93, the breakable plate 88, the first deforming member 80, and the enlarged diameter portion 37 are disposed in this order above the electrode assembly 52 in between the electrode assembly 52 (see FIG. 1 also) and the casing 18. A groove 92 and a recess 86 are provided on a surface of the enlarged diameter portion 37 on a breakable plate 88 side. The recess 86 is an example of a restricting structure that restricts a movement of the first deforming member 80. The recess 86 is provided on an inner side than the groove 92. The recess 86 is configured by one of sidewalls defining the groove 92.

An opposed surface 35 of the enlarged diameter portion 37 opposed to the breakable plate 88 is recessed toward its center. In other words, the opposed surface 35 is sloped so as to separate away from the breakable plate 88 from its end portion toward the center. The opposed surface 35 means a surface of the enlarged diameter portion 37 opposed to the breakable plate 88 where the first deforming member 80 is not fixed. Notably, a "groove" means a structure with a bottom surface surrounded by two sidewalls. Further, a "recess" means a structure simply having lower height than its surrounding, and means a structure having a step.

A wove 96 is provided on the breakable plate 88 on an enlarged diameter portion 37 side. The groove 96 is provided at a position facing the groove 92. The breakable plate 88 has a connecting member 26 fixed thereto. The breakable plate 88 is configured to be conducted with the negative electrode tab 20 via the connecting member 26 and the negative electrode lead 24 (see FIG. 1 also). Notably, the breakable plate 88 and the connecting member 26 may be one member configured integrally. As aforementioned, the connecting member 26 and the negative electrode lead 24 may be an integrated member. Due to this, all of the breakable plate 88, the connecting member 26, and the negative electrode lead 24 may be an integrated member. A thickness of a center portion 88a of the breakable plate 88 is thinner than a thickness of an end portion 88b. Further, a breakable groove 90 is provided around the center portion 88a. The breakable groove 90 forms a continuous circle at the center portion 88a. A recess 89 is provided on an opposite side from the enlarged diameter portion 37 on the breakable plate 88. The recess 89 is provided at the end portion 88b of the breakable plate 88.

A supporting member 78 supports the enlarged diameter portion 37 of the negative electrode terminal 30 and the breakable plate 88. The supporting member 78 comprises a metal-made outer side portion 72, an insulating first inner side portion 74, and an insulating second inner side portion 75. The first inner side portion 74 is disposed inside the outer side portion 72, and is disposed above the second inner side portion 75 (on casing 18 side). The second inner side portion 75 is disposed inside the outer side portion 72, and is disposed below the first inner side portion 74 (on electrode assembly 52 side). The enlarged diameter portion 37 and the breakable plate 88 are positioned by the outer side portion 72. Specifically, the breakable plate 88 is fixed to the enlarged diameter portion 37 by caulking the out side portion 72 after having disposed the first inner side portion 74 and the second inner side portion 75 at predetermined positions. Notably, the inner side portions 74, 75 insulate the enlarged diameter portion 37 and the breakable plate 88.

An insulating member 94 is disposed between the enlarged diameter portion 37 (negative electrode terminal 30) and the breakable plate 88. The insulating member 94 maintains a space between the enlarged diameter portion 37 and the breakable plate 88. That is, the insulating member 94 prevents the enlarged diameter portion 37 and the breakable plate 88 from making direct contact. The insulating member 94 prevents the enlarged diameter portion 37 and the breakable plate 88 from being conducted directly at portions other than a center portion 80a of the first deforming member 80 and the center portion 88a of the breakable plate 88 to be described later. A part of the insulating member 94 is positioned within the grooves 92, 96. The insulating member 94 is restricted of its movement toward the first deforming member 80.

The first deforming member 80 is a diaphragm made of metal. The first deforming member 80 is disposed between the enlarged diameter portion 37 and the breakable plate 88. An end portion 80b of the first deforming member 80 is fixed to the enlarged diameter portion 37. More specifically, the end portion 80b of the first deforming member 80 is welded to the enlarged diameter portion 37 in a state where an outer circumferential edge of the first deforming member 80 is making contact with a sidewall of the recess 86 of the enlarged diameter portion 37. The sidewall of the recess 86 is a contact surface where the outer circumferential edge of the first deforming member 80 makes contact. The recess 86 restricts a movement of the first deforming member 80. A positional displacement of the first deforming member 80 relative to the enlarged diameter portion 37 can be prevented by making the outer circumferential edge of the first deforming member 80 make contact with the sidewall of the recess 86.

The center portion 80a of the first deforming member 80 protrudes so as to separate away from the enlarged diameter portion 37. In other words, the first deforming member 80 approaches closer to the breakable plate 88 from its end portion 80b toward its center portion 80a. The center portion 80a of the first deforming member 80 is fixed to the breakable plate 88 inside the breakable groove 90. More specifically, when the current interruption device 50 is seen from a plan view (seen from above in FIG. 2), the center portion 80a is welded to the breakable plate 88 in a range surrounded by the breakable groove 90.

The second deforming member 93 is a diaphragm made of metal. The second deforming member 93 is disposed on an opposite side from the first deforming member 80 relative to the breakable plate 88. That is, the breakable plate 88 is disposed between the first deforming member 80 and the second deforming member 93. An end portion 93b of the second deforming member 93 is fixed to the breakable plate 88. More specifically, the end portion 93b of the second deforming member 93 is welded to the breakable plate 88 in a state where an outer circumferential edge of the second deforming member 93 is making contact with a sidewall of the recess 89 of the breakable plate 88. The sidewall of the recess 89 is a contact surface where the outer circumferential edge of the second deforming member 93 makes contact. The recess 89 restricts a movement of the second deforming member 93. A positional displacement of the second deforming member 93 relative to the breakable plate 88 can be prevented by making the outer circumferential edge of the second deforming member 93 make contact with the sidewall of the recess 89.

An insulating projection 95 is provided on a breakable plate 88 side of the second deforming member 93. A projection 95 is disposed at the center portion 93a of the second deforming member 93, and has a shape projecting out toward the breakable plate 88. The projection 95 is opposed to the center portion 88a of the breakable plate 88. More specifically, when the current interruption device 50 is seen from the plan view (seen from above in FIG. 2), the projection 95 is positioned in the range surrounded by the breakable groove 90. The second deforming member 93 projects so as to separate further away from the breakable plate 88 from its end portion 93b toward its center portion 93a.

A sealing member 84 is disposed between the enlarged diameter portion 37 and the breakable plate 88. The sealing member 84 is an insulating O ring. The sealing member 84 is disposed outside the insulating member 94. The sealing member 84 insulates the enlarged diameter portion 37 and the breakable plate 88, and maintains inside of the current interruption device 50 airtight. That is, the sealing member 84 seals the enlarged diameter portion 37 and the breakable plate 88 to insulate the space inside the current interruption device 50 from a space outside the current interruption device 50 (space inside the casing 18). Notably, as aforementioned, a part of the insulating member 94 is positioned within the grooves 92, 96. Due to this, the insulating member 94 is restricted from moving toward the sealing member 84.

When the internal pressure of the casing 18 is equal to or less than a predetermined value, the negative electrode terminal 30 is conducted with the negative electrode via the first deforming member 80, the breakable plate 88, the connecting member 26, the negative electrode lead 24, and the negative electrode tab 20. When the internal pressure of the casing 18 is equal to or less than the predetermined value, a space is provided between the projection 95 and the breakable plate 88.

For example, when the electricity storage device 100 comes to be in an overcharged state, or in an overheated state, the internal pressure of the casing 18 rises and exceeds the predetermined value. When the internal pressure of the casing 18 rises and exceeds the predetermined value, the second deforming member 93 deforms toward the breakable plate 88. That is, the center portion 93a moves toward the center portion 88a of the breakable plate 88. In other words, the second deforming member 93 inverts with the end portion 93b as its supporting point. More specifically, the center portion 93a of the second deforming member 93 is at a first position where it projects in the direction separating away from the breakable plate 88 when the internal pressure of the casing 18 is equal to or less than a predetermined value, and the center portion 93a of the second deforming member 93 is at a second position where it projects toward the breakable plate 88 when the internal pressure of the casing 18 exceeds the predetermined value. The projection 95 comes to be in contact with the breakable plate 88, and the breakable plate 88 breaks with the breakable groove 90 as a break starting point. The first deforming member 80 and the breakable plate 88 become separated, and the breakable plate 88 and the first deforming member 80 come to be in a nonconducted state. Since the negative electrode terminal 30 and the negative electrode come to be in the nonconducted state, current can be prevented from flowing between the positive electrode terminal 2 and the negative electrode terminal 30 (see FIG. 1 also).

Notably, when the breakable plate 88 breaks, the center portion 80a of the first deforming member 80 moves from the breakable plate 88 side toward the enlarged diameter portion 37 side. In other words, the first deforming member 80 is inverted. Notably, as aforementioned, since the opposed surface 35 of the enlarged diameter portion 37 is messed, the inversion of the first deforming member 80 will not be hindered by the enlarged diameter portion 37 (negative electrode terminal 30). The first deforming member 80 and the breakable plate 88 can be prevented from coming into a conducted state again after the breakable plate 88 has been broken. That is, the current can be prevented from flowing again between the positive electrode terminal 2 and the negative electrode terminal 30 after the pressure in the casing 18 has risen and the current interruption device 50 has been activated.

Further, when the second deforming member 93 is inverted, a part of the projection 95 comes to be positioned above the breakable plate 88. In other words, the projection 95 passes through the center portion of the breakable plate 88. The projection 95 restricts the first deforming member 80 from moving downward (toward the breakable plate 88 side). Due to this, the first deforming member 80 and the breakable plate 88 can more surely be prevented from coming into the conducted state again.

An advantage of the electricity storage device 100 will be described. As aforementioned, the restricting structure (recess 86) that restricts the movement of the first deforming member 80 is provided in the enlarged diameter portion 37 (negative electrode terminal 30). The first deforming member 80 can be fixed to the enlarged diameter portion 37 while the outer circumferential edge of the first deforming member 80 is caused to make contact with the sidewall of the recess 86. That is, the first deforming member 80 can be fixed to the enlarged diameter portion 37 while being in a state where the first deforming member 80 is not positionally displaced relative to the enlarged diameter portion 37. The inversion of the first deforming member 80 becomes smooth, and the first deforming member 80 can surely be separated from the breakable plate 88. Similarly, the restricting structure (recess 89) that restricts the movement of the second deforming member 93 is provided in the breakable plate 88. The second deforming member 93 can be fixed to the breakable plate 88 while the outer circumferential edge of the second deforming member 93 is caused to make contact with the sidewall of the recess 89. That is, the second deforming member 93 can be fixed to the breakable plate 88 while being in a state where the second deforming member 93 is not positionally displaced relative to the breakable plate 88. The inversion of the second deforming member 93 becomes smooth, and the breakable plate 88 can surely be broken. By providing the restricting structures that restrict the movements of the first deforming member 80 and the second deforming member 93, the current interruption device 50 can be prevented from malfunctioning.

As aforementioned, the insulating member 94 is restricted from moving toward the first deforming member 80 and the sealing member 84. Due to this, a movable range of the first deforming member 80 can be prevented from becoming narrowed due to the insulating member 94 making contact with the first deforming member 80. Further, with the insulating member 94 making contact with the first deforming member 80, the shape of the first deforming member 80 can be prevented from deforming before the pressure in the casing 18 rises. Notably, since the outer circumferential edge of the first deforming member 80 makes contact with the sidewall of the recess 86 of the enlarged diameter portion 37, the first deforming member 80 is also restricted from moving toward the insulating member 94. Moreover, an exist space for the sealing member 84 can be prevented from becoming narrowed due to the insulating member 94 making contact with the sealing member 84. When the existing space for the sealing member 84 becomes narrowed, a filling rate of the sealing member 84 increases, and a defect such as a damage to the sealing member 84 and the like may occur.

In the current interruption device 50, the second debuting member 93 partitions inside and outside of the current interruption device 50. Due to this, changes in the internal pressure of the casing 18 directly affect the second deforming member 93. By using the second deforming member 93 that is inverted according to the internal pressure of the casing 18, the breakable plate 88 can surely be broken when the internal pressure of the casing 18 exceeds the predetermined value. Further, by using the second deforming member 93, the breakable plate 88 can be insulated from the outside of the current interruption device 50 (inside of the casing 18). Even if arc is generated when the breakable plate 88 breaks, the arc can be prevented from making contact with gas (for example, hydrogen) inside the casing 18.

Second Embodiment

Figure 3:
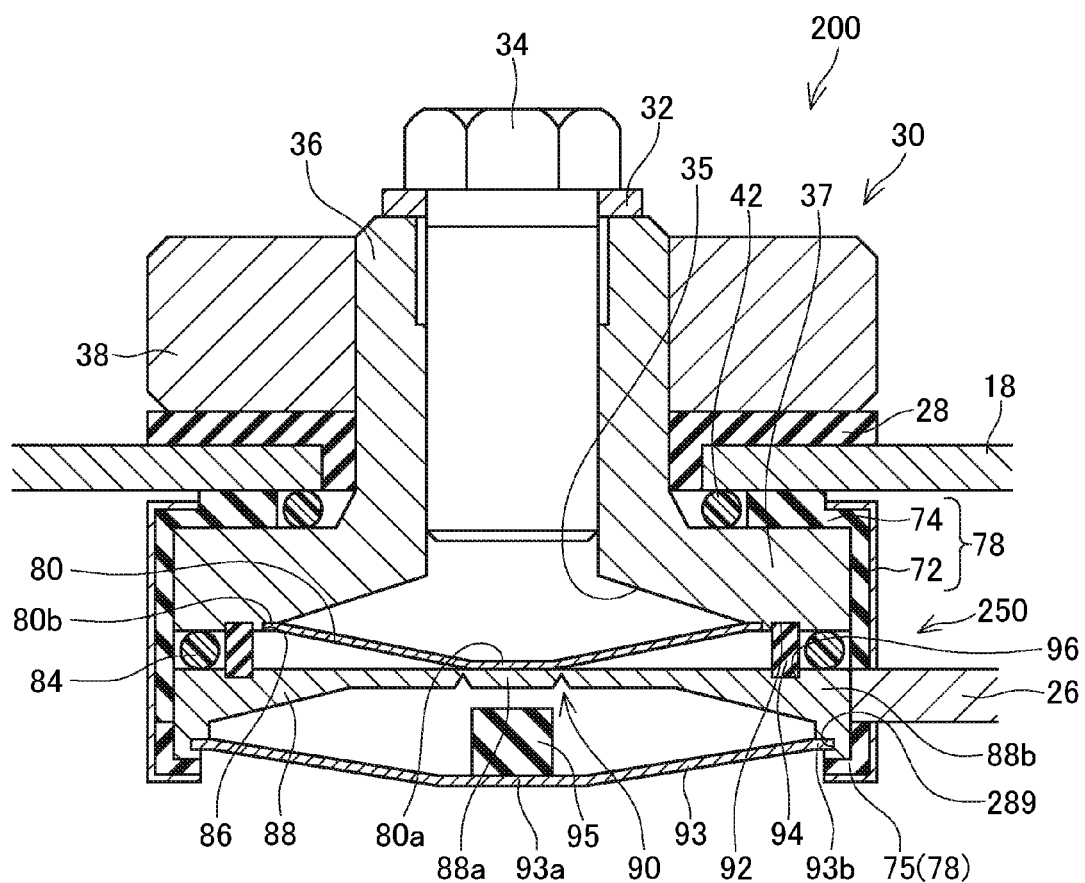
FIG. 3 is an enlarged cross sectional view of a current interruption device used in an electricity storage device of a second embodiment.

An electricity storage device 200 be described with reference to FIG. 3. The electricity storage device 200 is a variant of the electricity storage device 100, and its structure of a current interruption device 250 differs from the current interruption device 50 of the electricity storage device 100. As to the electricity storage device 200, parts that are the same as the electricity storage device 100 will be given the same reference signs as the electricity storage device 100, by which a description thereof may be omitted.

The current interruption device 250 differs from the current interruption device 50 in its shape of the restricting structure that restricts the movement of the second deforming member 93. In the current interruption device 250, an insertion hole 289 is provided at the end portion 88b of the breakable plate 88. The outer circumferential edge of the second deforming member 93 makes contact with a bottom surface of the insertion hole 289 by inserting the end portion 93b of the second deforming member 93 into the insertion hole 289. Due to this, the positional displacement of the second deforming member 93 relative to the breakable plate 88 can be prevented.

In the aforementioned current interruption devices 50, 250, the first conducting member that fixes the end portion 80b of the first deforming member 80 is a part of the negative electrode terminal 30 (enlarged diameter portion 37). The first conducting member itself may be a part of an external terminal, that connects an external wiring and the like, or alternately, an external terminal that connects the external wiring and the like may be provided separate from the first conducting member, and the first conducting member and this external terminal may be connected by a conductive lead and the like. Further, the first deforming member may not be fixed directly onto the first conducting member, and instead a conductive lead may be connected to the first conducting member and the first deforming member may be connected to this lead. Further, in a case where the first conducting member is a separate component from the electrode terminal, the first conducting member and the electrode (positive electrode or negative electrode) may be connected, and the breakable plate (second conducting member) and the electrode terminal may be connected. Notably, the second deforming member 93 may not be made of metal.

In the current interruption device 250, the restricting structure that restricts the movement of the first deforming member 80 is the recess 86, and the restricting structure that restricts the movement of the second deforming member 93 is the insertion hole 289. Both of the restricting structure that restricts the movement of the first deforming member 80 and the restricting structure that restricts the movement of the second deforming member 93 may be insertion holes. Alternatively, the restricting structure that restricts the movement of the first deforming member 80 may be an insertion hole, and the restricting structure that restricts the movement of the second deforming member 93 may be a recess. Notably, only the restricting structure that restricts the movement of the first deforming member 80 may be provided on the enlarged diameter portion 37 (first conducting member), and the restricting structure that restricts the movement of the second deforming member 93 may not be provided on the breakable plate 88. Alternatively, the restricting structure that restricts the movement of the first deforming member 80 may not be provided on the enlarged diameter portion 37 (first conducting member), and only the restricting structure that restricts the movement of the second deforming member 93 may be provided on the breakable plate 88.

The aforementioned electricity storage devices simply needs to have a groove provided at least on one of the first conducting member and the second conducting member to restrict the movement of the insulating member disposed between the first conducting member and the second conducting member. Due to this, varieties of structures of the current interruption device and materials of components configuring the electricity storage device may be used. Hereinbelow, materials of the components configuring the electricity storage device will be exemplified for a lithium ion secondary battery that is an example of the electricity storage device.

An electrode assembly will be described. The electrode assembly comprises a positive electrode, a negative electrode, and a separator intervened at a position between the positive electrode and the negative electrode. The positive electrode comprises a metal foil for the positive electrode, and a positive electrode active material layer provided on the metal, foil for the positive electrode. A positive electrode tab corresponds to the metal foil for the positive electrode where the positive electrode active material layer is not applied. The negative electrode comprises a metal foil for the negative electrode, and a negative electrode active material layer provided on the metal foil for the negative electrode. A negative electrode tab corresponds to the metal foil for the negative electrode where the negative electrode active material layer is not applied. Notably, materials contained in the electrode active material layer (active material, binder, conduction assisting agent, and the like) are not particularly limited, and those materials used for electrodes in a well-known electricity storage device and the like may be used.

Aluminum (Al), nickel (Ni), titan (Ti), stainless steel, or a composite material thereof may be used as the metal foil for the positive electrode. Especially, it is preferably aluminum or composite material containing aluminum. Further, similar material as that of the metal foil for the positive electrode may be used as a material of the positive electrode lead.

The positive electrode active material may be any material which lithium ions can intrude into and separate out from; and $Li_2MnO_3$, $Li(NiCoMn)_{0.33}O_2$, $Li(NiMn)_{0.5}O_2$, $LiMn_2O_4$, $LiMnO_2$, $LiNiO_2$, $LiCoO_2$, $LiNi_{0.8}Co_{0.15}Al_{0.05}O_2$, $Li_2MnO_2$, $LiMn_2O_4$, and the like may be used. Further, as the positive electrode active material, alkali metal such as lithium, sodium, and the like, or sulfur and the like may be used. One type thereof may be used solely, or two or more types may be used together. The positive electrode active material is applied onto the metal foil for the positive electrode together with conductive materials, binding agents, and the like as needed.

As the metal foil for the negative electrode, aluminum, nickel, copper (Cu), and the like, or a composite material thereof may be used. Especially, it is preferably copper or composite material containing copper. Further, similar material as that of the metal foil for the negative electrode may be used as a material of the negative electrode lead.

As the negative electrode active material, a material which lithium ions can intrude into and separate out from is used. Alkali, metals such as lithium (Li), sodium (Na), and the like, transition metal oxide containing the alkali metal, a carbon material such as natural graphite, meso-carbon microbeads, highly oriented graphite, hard carbon, soft carbon, and the like, elemental silicon, silicon-containing alloy, and silicon-containing oxide may be used. Notably, the negative electrode active material is especially preferably a material not containing lithium (Li) in order to increase battery capacity. The negative electrode active material is applied, onto the metal foil for the negative electrode together with conductive materials, binding agents, and the like as needed.

The separator uses a porous material having insulating property. As the separator, a porous film made of polyolefin-based resin such as polyethylene (PE), polypropylene (PP), and the like, and woven or nonwoven fabric made of polypropylene, polyethylene-terephthalate (PET), methylcellulose and the like may be used.

As the electrolytic solution, it is preferably a nonaqueous electrolytic solution in which supporting electrolyte (electrolyte) is dissolved in nonaqueous solvent. As the nonaqueous solvent, a solvent containing acyclic esters such as ethylene carbonate (EC), propylene carbonate (PC), dimethyl carbonate (DMC), diethyl carbonate (DEC), ethylmethyl carbonate (EMC), and the like, a solvent such as ethyl acetate or methyl propionate, or a mixture thereof may be used. Further, as the supporting electrolyte (electrolyte), for example, $LiPF_6$, $LiBF_4$, $LiAsF_6$, and the like may be used.

Specific examples the present invention are described above in detail, but these examples are merely illustrative and place no limitation on the scope of the patent claims. The technology described in the patent claims also encompasses various changes and modifications to the specific examples described above. The technical elements explained in the present disclosure or drawings provide technical utility either independently or through various combinations. The present invention is not limited to the combinations described at the time the claims are filed. Further, the purpose of the examples shown by the present disclosure or drawings is to satisfy multiple objectives simultaneously, and satisfying any one of those objectives gives technical utility to the present invention.

The invention claimed is:

1. A current interruption device configured to interrupt a conduction between an electrode terminal and an electrode in a case where pressure in a casing of a electricity storage device exceeds a predetermined value, the current interruption device comprising
    a first conducting member fixed to the casing;
    a second conducting member disposed at a position opposed to the first conducting member;
    a first deforming member disposed between the first conducting member and the second conducting member, the first deforming member configured to make contact with the second conducting member when the pressure in the casing is equal to or less than the predetermined value, and configured not to make contact with the second conducting member when the pressure in the casing exceeds the predetermined value; and
    a second deforming member disposed on an opposite side of the first deforming member relative to the second conducting member, the second deforming member comprising a projection which projects toward a center portion of the second conducting member, wherein a center portion of the second deforming member projects in a direction away from the second conducting member when the pressure in the casing is equal to or less than the predetermined value, and the center portion of the second deforming member moves toward the second conducting member so that the projection makes contact with the second conducting member when the pressure in the casing exceeds the predetermined value,
    wherein a restricting structure that restricts a movement of the second deforming member is a groove disposed on the second conducting member on an opposite side from a first deforming member side,
    the end portion of the second deforming member is in the groove, and
    an outer peripheral edge of the second deforming member makes contact with a side surface of the groove.

2. The current interruption device according to claim 1, wherein the end portion of the second deforming member is welded to the second conducting member.

3. An electricity storage device comprising:
    the current interruption device according to claim 1.

4. The electricity storage device according to claim 3, wherein
    the electricity storage device is a secondary battery.

* * * * *